(12) United States Patent
Polanyi et al.

(10) Patent No.: US 7,260,519 B2
(45) Date of Patent: *Aug. 21, 2007

(54) SYSTEMS AND METHODS FOR DYNAMICALLY DETERMINING THE ATTITUDE OF A NATURAL LANGUAGE SPEAKER

(75) Inventors: Livia Polanyi, Palo Alto, CA (US); Annie Zaenen, Redwood City, CA (US); Misty L. Azara, Los Altos, CA (US); James D. Baker, Menlo Park, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 943 days.

This patent is subject to a terminal disclaimer.

(21) Appl. No.: 10/387,719

(22) Filed: Mar. 13, 2003

(65) Prior Publication Data

US 2004/0186719 A1 Sep. 23, 2004

(51) Int. Cl.
*G06F 17/27* (2006.01)
(52) U.S. Cl. ........................................................ 704/9
(58) Field of Classification Search ...................... None
See application file for complete search history.

(56) References Cited

U.S. PATENT DOCUMENTS

| | | | |
|---|---|---|---|
| 5,870,709 A | 2/1999 | Bernstein | |
| 5,987,415 A * | 11/1999 | Breese et al. | 704/270 |
| 6,161,091 A | 12/2000 | Akamine | |
| 6,173,260 B1 * | 1/2001 | Slaney | 704/250 |
| 6,224,383 B1 | 5/2001 | Shannon | |
| 6,299,452 B1 | 10/2001 | Wasowicz | |
| 6,324,507 B1 | 11/2001 | Lewis | |
| 6,332,143 B1 * | 12/2001 | Chase | 707/100 |
| 6,389,435 B1 | 5/2002 | Golovchinsky | |
| 6,529,864 B1 * | 3/2003 | Chase | 704/9 |
| 6,622,140 B1 * | 9/2003 | Kantrowitz | 707/5 |
| 6,999,914 B1 * | 2/2006 | Boerner et al. | 704/1 |
| 7,136,877 B2 * | 11/2006 | Volcani et al. | 707/200 |
| 2002/0083104 A1 | 6/2002 | Polanyi et al. | |
| 2002/0194230 A1 | 12/2002 | Polanyi et al. | |
| 2003/0055654 A1 * | 3/2003 | Oudeyer | 704/275 |
| 2003/0212546 A1 * | 11/2003 | Shaw | 704/9 |

OTHER PUBLICATIONS

Mani, Inderjeet et al., "Machine Learning of Generic and User-Focused Summarization", *Proceedings of The Fifteenth National/Tenth Conference On Artificial Intelligence/Innovative Applications Of Artificial Intelligence Table Of Contents*, pp. 820-826, (1998).

(Continued)

*Primary Examiner*—David Hudspeth
*Assistant Examiner*—Brian L. Albertalli
(74) *Attorney, Agent, or Firm*—Fliesler Meyer LLP (57) ABSTRACT

Systems and methods for analyzing speech containing at least one lexical item, said analysis to determine an attitude of a speaker towards an entity, comprising determining at least one actual valence for the at least one lexical item by analyzing the at least one lexical item in context; determining the attitude based on the at least one actual valence; associating the speaker, the entity and the attitude; and wherein the at least one lexical item encodes attitude information about the entity.

78 Claims, 2 Drawing Sheets

OTHER PUBLICATIONS

Martin J.R., "English Text: System and Structure," *Benjamins: Philadelphia and Amsterdam*, (1992), pp. 344-348.

Williams, Carl E., *Emotions and Speech: Some Acoustical Correlates*, in *The Journal of the Acoustical Society of America*, vol. 52, No. 4 (Part 2) 1972, pp. 1238-1250.

Mozziconacci, S.J.L. et al., *Role of Intonation Patterns in Conveying Emotion in Speech*, ICPhS99, San Francisco, pp. 2001-2004, (1999).

Connor, Ulla, *Constrastive Rhetoric Cross-cultural Aspects of Second-Language Writing*, Cambridge University Press, pp. 14-25, 1996.

Nakatani, Christine Hisayo, *The Computation Processing of Intonational Prominence: A Functional Prosody Perspective*, Thesis paper presented by author to Division of Engineering and Applied Sciences, Harvard University, Cambridge, Massachusetts, 116 pages, May 1997.

Pierrehumbert, Janet and Julia Hirschberg, The *Meaning of Intonational Contours in the Interpretation of Discourse*, Chapter 14 of *Intentions in Communication*, Cohen, Philip, et al., editors, 39 pages (1990).

Cauldwell, Richard, "Tones, Attitudinal Meanings, and Context", Speak Out! Newsletter of the IATEFL Pronunciation Special Interest Group, No. 21, Dec. 1997, pp. 30-35.

Skorochodko, E., "Adaptive Method of Automatic Abstracting and Indexing," In *Information Processing*, vol. 2, North-Holland Publishing Company (1971) pp. 1179-1182.

Grefenstette, Gregory, *Producing intelligent telegraphic text reduction to provide an audio scanning service for the blind*. In *AAAI 98 Spring Symposium on Intelligent Text Summarization*, pp. 111-117, 1998.

Maynard, Senko K. *Principles of Japanese Discourse: A Handbook*, Cambridge University Press, pp. 23-98, 1998.

Longacre, R.E., "An Anatomy of Speech Notions," *The Peter de Ridder Press, Lisse* (1976).

Halliday, M.A., et al., "Text and Context: Aspects of Language in a Social Semiotic Perspective," *Geelong:Vic. : Deakin University Press* (1985).

Marcu, Daniel "The Rhetorical Parsing of Natural Language Texts", *The Proceedings of the 35th Annual Meeting of the Association for Computational Linguistics*, (ACL '97/EACL '97) pp. 96-103, Madrid, Spain, Jul. 7-10, 1997.

Polanyi, L., et al., "On the Recursive Structure of Discourse," In: K. Ehrlich and H. van Riemsdijk (eds), *Connectedness in Sentence, Discourse and Text* (1983) Tilburg University, (1983) pp. 141-178.

Ansari, Daniel., et al., "Generating Warning Instructions by Planning Accidents and Injuries," *Department of Computer Science, University of Toronto, Toronto, Ontario* (1995) 10 pages.

Appelt, Douglas E., et al., *Introduction to Information Extraction Technology, Artificial Intelligence Center, SRI International*, pp. 1-41 (1999).

Barzilay, Regina et al., "Using Lexical Chains forText Summarization," In *Proceedings of the ACL'97/EACL'97 Workshop on Intelligent Scalable Text Summarization*, (1997) pp. 10-17.

Baxendale, P. B., "Machine-Made Index for Technical Literature—An Experiment," *IBM Journal of Research and Development*, vol. 2, No. 4, Oct. 1958, pp. 354-361.

Bryant, Gregory A. et al., *Recognizing Verbal Irony in Spontaneous Speech*, Lawrence Erlbaum Associates, Inc., University of California, Santa Cruz, Metaphor and Symbol, 17(2), pp. 99-117. 2002.

Cauldwell, Richard T., *Where did the Anger go? The Role of Context in Interpreting Emotion in Speech*, In Speech Emotion (2000), 127-131.

Corston-Oliver, Simon, *Text Compacting for Display on Very Small Screens*, in North American Chapter of the Association of Computational Linguist (NAACL) 2001 Language Technologies Workshops, Jun. 3-4, 2001.

Dalianis, Hercules, "Aggregation as a Subtask of Text and Sentence Planning," In J.H. Stewman (ed.), Proceedings of Florida AI Research Symposium, FLAIRS-96, pp. 1-5, Key West, Florida, May 20-22, 1996.

Edmundson, H.P., "New Methods in Automatic Extracting," *Journal of the Association For Computing Machinery*, vol. 16, No. 2, Apr. 1969, pp. 264-285.

Halliday, M.A.K., et al., "Cohesion in English," London:Longmans (1976).

Hovy, Eduard et al., "Automated text Summarization in SUMMARIST", *In Advances in Automatic Text Summarization*, 14 pages Aug. 8, 1997.

Joyce, Michael, "Storyspace as a Hypertext System for Writers and Readers of Varying Ability," *Hypertext 91 Proceedings*, ACM, Baltimore (1991) pp. 381-389.

Kan, M.-Y, K. R. McKeown, and J. L. Klavans, *Applying Natural Language Generation to Indicative Summarization*, In Proc. of 8th European Workshop on Natural Language Generation, Toulouse, France, 2001. 9 pages.

Kupiec, Julian et al., "A Trainable Document Summarizer," *In Proceedings of the 18th ACM/SIGIR Annual Conference on Research and Development in Information Retrieval*, Seattle, Washington (Jul. 9-13, 1995) pp. 68-73.

Lin, Chin-Yew, "Knowledge-based Automatic Topic Identification," *In Proceedings of the 33rd Annual Meeting of the Association for Computational Linguistics* (ACL-95) (1995) pp. 308-310.

Lin, Chin-Yew et al., "Identifying Topics by Position," *In Proceedings of the Fifth Conference on Applied Natural Language Processing*, (ANLP-97) (1997) pp. 287-290.

Longacre, Robert E., "Discourse Analysis and Literacy," In Gorman, Thomas P. (editor) Language and Literacy, Tehran, Iran, International Association for Adult Literacy Methods (1977) 301, pp. 71-87.

Luhn, H.P., "The Automatic Creation of Literature Abstracts," *IBM Journal of Research and Development* vol. 2, No. 2, Apr. 1958, pp. 159-165.

Mani, Inderjeet et al., "Multi-Document Summarization by Graph Search and Matching," *In Proceedings of the Fourteenth National Conference on Artificial Intelligence* (AAAI-97) (1997) pp. 622-628.

Mann, William C. et al., "Rhetorical Structure Theory: Toward a Functional Theory of Text Organization," *Text* 8(3) (1988) pp. 243-281.

Marcu, Daniel, "Discourse Trees Are Good Indicators of Importance in Text," In I. Mani and M. Maybury editors, *Advances in Automatic Text Summarization*, The MIT Press, (1999) pp. 123-136.

Marshall, Catherine C. et al., "Aquanet: A Hypertext Tool to Hold Your Knowledge in Place," *Proceedings of Third ACM Conference on Hypertext Hypertext '91*, San Antonio, Texas (1991) pp. 261-275.

Mellish, C., Knott, A., Oberlander, J., & O'Donnell, M., *Experiments Using Stochastic Search for Text Planning*, In Proceedings of International Conference on Natural Language Generation, (1998) pp. 97-108.

Polanyi, L, "A Formal Model of the Structure of Discourse," *In: Journal of Pragmatics 12*, (1988) pp. 601-638.

Polanyi, L., "The Linguistic Structure of Discourse," *Institute for Logic, Language and Computation Faculty of Arts*, University of Amsterdam, Spuistraat 134, 1012 VB, Amsterdam, (Nov. 1995) pp. 1-64.

Polanyi, L., et al., "A Syntactic Approach to Discourse Semantics," *In Proceedings of the 6th International Conference on Computational Linguistics*, Stanford, California (1984).

Polanyi, L., et al., "Discourse Structure and Discourse Interpretation," *In Proceedings of the Tenth Amsterdam Colloquium*, ILLC, Amsterdam (1996).

Prüst, Hub et al., "Discourse Grammar and Verb Phrase Anaphora," *Linguistics and Philosophy*, (Aug. 1994) pp. 1-64.

Rambow, Owen et al., "Natural Language Generation in Dialog Systems," *In Proceedings of the First International Conference on Human Language* Technology, San Diego, CA (2001) 4 pages.

Rush, J.E., et al., "Automatic Abstracting and Indexing," Production of indicative abstracts by application of contextual inference and syntactic coherence criteria, *Journal of American Society for Information Sciences*, vol. 22, No. 4, Jul.-Aug. 1971, pp. 260-274.

Scott, Mike, et al., editors "Patterns of Lexis in Text," *Oxford University Press*, introduction page, (1991).

Sparck Jones, K., "What Might Be in a Summary?" *In Information Retrieval 93: Von der Modellierung zur Anwendung*, (1993b) pp. 9-26.

Stone, Matthew and Doran, Christine, 1997. "Sentence Planning as Description Using Tree Adjoining Grammar." In Proceedings of the 35 th Annual Meeting of the Association for Computational Linguistics (ACL97/EACL97). Madrid, Spain: Morgan Kaufmann, Palo Alto CA, 198-205.

Tatham, Mark et al., *Modelling Speech Prosodics for Synthesis-Perspectives and Trials*, IEE Seminar, State-Of-The-Art In Speech Synthesis, London, Apr. 2000.

Teufel, Simone, et al., "Sentence Extraction as a Classification Task," *In Proceedings of the ACL'97/EACL'97 Workshop on Intelligent Scalable Text Summarization* (1997) pp. 58-65.

Trigg, R., "Note Cards in a Nutshell," *Proc. ACM CHI+GI 87* (Toronto, 5-9 Apr. 1987) pp. 45-52.

Wichmann, A., *The Attitudinal Effects of Prosody, and How They Relate to Emotion*, (2000), 143-148.

* cited by examiner

SYSTEMS AND METHODS FOR DYNAMICALLY DETERMINING THE ATTITUDE OF A NATURAL LANGUAGE SPEAKER

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

This application is related to the following co-pending applications which are each hereby incorporated by reference in their entirety:

SYSTEM AND METHOD FOR SUMMARIZATION COMBINING NATURAL LANGUAGE GENERATION WITH STRUCTURAL ANALYSIS, U.S. application Ser. No. 10/231,732; Inventors: Livia Polanyi, et al., filed on Aug. 30, 2002.

SYSTEM AND METHOD FOR DYNAMICALLY DETERMINING THE FUNCTION OF A LEXICAL ITEM BASED ON CONTEXT, U.S. application Ser. No. 10/364, 038, Inventors: Livia Polanyi, et al., filed on Feb. 11, 2003.

SYSTEM AND METHOD FOR DYNAMICALLY DETERMINING THE FUNCTION OF A LEXICAL ITEM BASED ON DISCOURSE HIERARCHY STRUCTURE, U.S. application Ser. No. 10/364,191, Inventors: Livia Polanyi, et al., filed on Feb. 11, 2003.

SYSTEM AND METHOD FOR DYNAMICALLY DETERMINING THE ATTITUDE OF AN AUTHOR OF A NATURAL LANGUAGE DOCUMENT, U.S. application Ser. No. 10/364,208, Inventors: Livia Polanyi, et al., filed on Feb. 11, 2003.

FIELD OF THE DISCLOSURE

The present invention disclosure relates to automatic analysis of natural language, and in particular, the dynamic determination of a speaker's attitudes towards entities and events discussed in the speaker's writing.

BACKGROUND

It is sometimes desirable to ascertain the attitude of a speaker towards entities or events described in the speaker's speech. Some methods of attitude evaluation involve merely summing the number of spoken terms having positive versus negative connotations to derive a summary score. For example, positive words can be assigned a positive value while negative words are assigned a negative value. In this approach, the sum of the values would represent the (positive or negative) attitude of the speaker. This approach is too simplistic, however, since it does not discriminate between entities and/or events, some of which the speaker may view in a positive light and others the speaker may view negatively. Another limitation of this approach is that it fails to take into account the influence that context can have on nominally positive or negative terms.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will be apparent to one skilled in the art that the present invention may be practiced without the specific details. In other instances, well-known features are omitted or simplified in order not to obscure the present invention.

Parts of the description will be presented in data processing terms, such as data, selection, retrieval, generation, and so forth, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through electrical and/or optical components of a processor and its subsystems.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The sounds a speaker produces comprise a speech signal. A speech signal encodes a multitude of information. Sounds in the speech signal can correspond to words or phrases in a natural language. The acoustic characteristics of a speech signal (e.g., fundamental frequency, pitch, stress, accent, intensity, etc.) can provide insight into to a speaker's emotional state and can also be used by a speaker to convey a relationship between certain utterances and the beliefs of the speaker and a hearer (or hearers).

Some words or phrases encoded in a speech signal can be characterized as lexical items. Lexical items encode a mixture of positive and negative information from which a speaker's attitudes or opinions regarding entities and events can be inferred. This encoded information is referred to as valence or connotation. For example, the words heroic and tragic used to describe the same event have entirely different connotations. Assuming that a speaker chooses words that aptly express the speaker's meaning, an event described as heroic is expressing the speaker's positive attitude towards the event. Whereas a speaker who refers to an event as tragic is taking the opposite stand.

Lexical items can also be used by a speaker to indirectly express an attitude. For example:

(1) John is inconsiderate.

(2) John arrived early. That was inconsiderate.

The sentence in speech (1) above has a lexical item "inconsiderate" that carries with it a negative connotation reflecting the speaker's unenthusiastic assessment of the entity "John". However, in speech (2) the same is accomplished indirectly. The first sentence in (2) has a lexical item "arrived early" that has either a neutral or positive connotation (as compared to "arrived late") reflecting the speaker's attitude towards the entity "John". But the second sentence in (2) contains the lexical item "inconsiderate" which refers to the act of John arriving early and indirectly implicates John. From this it can be inferred that the speaker is also expressing a negative assessment of John.

A natural language can be a language that humans use to communicate with each other, such as English, Japanese, French, Spanish, etc. This invention disclosure is not limited to or dependent on any particular natural language. Generally speaking, entities discussed or alluded to in a natural language can be persons, places, things, ideas, concepts, etc. Identification of entities or events in speech can be accomplished a number of ways, including using information extraction (IE) techniques. IE systems usually take as input a query that describes the information sought after and a template that specifies how the results of the query should be formatted. Two possible approaches to IE are knowledge engineering and automatic training. The knowledge engineering approach uses hand-crafted extraction rules based on domain patterns discovered by a human expert through analysis of a corpus. Automatic training systems learn extraction rules by analyzing texts that have been annotated (by a human expert) to point out which information is important. For purposes of this invention disclosure, the particular IE technique or system employed—whether currently existing or yet to be discovered—is immaterial.

IE systems can be "coarse-grained" or "fine-grained". At the "coarsest" level of entity extraction, there is the speech itself. At a deeper or less coarse level, we have general topic or subject areas in the speech. Deeper still, particular entities/events are identified. And so on. A coarse-grained system operates quickly but shallowly, allowing for fast operation but limited entity extraction. Fine-grained systems occupy the opposite end of the spectrum and can extract far more entities but at a slower speed. Of course, the type of extraction desired (i.e., shallow/coarse or deep/fine) can be tailored to the particular application area based on speed and depth requirements. In any case, a natural byproduct of IE is that the entities and events so extracted can be associated with the lexical items that directly or indirectly refer to them.

Generally speaking, lexical items can have a base valence or connotation that is positive, negative or neutral. In one embodiment, a lexical item's base valence could be stored in an electronic dictionary or lexical resource. In one embodiment, a negative or positive number can be associated with a lexical item to reflect its valence. By way of a non-limiting illustration, Table 1 lists English verbs, adjectives (and adverbs) and nouns which can be characterized as positively or negatively valenced.

TABLE 1

Base Valence of Exemplary Lexical Items

| PART OF SPEECH | POSITIVE | NEGATIVE |
| --- | --- | --- |
| Verb | Boost, Ease, Embrace, Encourage, Ensure, Manage, Delight, Reassure | Conspire, Discourage, Fail, Fiddle, Haggle, Meddle |

TABLE 1-continued

Base Valence of Exemplary Lexical Items

| PART OF SPEECH | POSITIVE | NEGATIVE |
| --- | --- | --- |
| Noun | Approval, Benefit, Chance, Credit, Favor, Freedom, Hope, Incentive, Innovation, Justification, Promise, Reliability, Solution, Success | Backlash, Backlog, Bankruptcy, Beating, Catastrophe, Complacency, Destruction, Egotism, Failure, Frown, Grimace, Guilt, Jealous, Lie, Mortuary, Theft, Vanity |
| Adjective | Attractive, Better, Brave, Bright, Creative, Dynamic, Generous, Improving, Innovative, Reliable, Secure, Successful | Annoying, Arbitrary, Awry, Bad, Botched, Capricious, Counterproductive, Disappointing, Dreadful, Flawed, Guilty, Half-baked |
| Adverb | Attractively | Annoyingly |

Sometimes it is difficult to determine the base valence of a lexical item without considering the context in which it occurs. For example, the lexical item bankruptcy when applied to a financial event can be an objective description and not an evaluation. Given that the event itself is generally perceived as negative, the word tends to be used in a broader context as a negative term. For this reason, in one embodiment context or domain information could be included in an electronic dictionary or lexical resource to aid in the appropriate selection of the base valence of a lexical item based on how the lexical item is used in speech.

By way of a further non-limiting illustration, the following texts (3)-(5) all communicate the same set of facts but the connotative force of the three texts is quite different.

(3) The eighteen year old walked through the part of town where he lived. He stopped for a while to talk with people on the street and then went to a store for some food to bring to the small apartment where he lived with some people he knew.

(4) The young man strolled through the neighborhood where he lived. He lingered to chat with people on the street and then dropped into a shop for some goodies to bring home to the cozy place which he shared with some friends.

(5) The teenaged male strutted through his turf. He loitered to shoot the bull with people on the street and then ducked into a dive for some grub to bring to the cramped hole-in-the-wall where he crashed with his some cronies.

Text (3) above is a neutral text that presents the facts without much attitudinal assessment of them. The facts in Text (4) are essentially identical: no new factual information about the eighteen year old from (3) has been added. Yet the young man in (4) emerges as a sympathetic character due to the presence of lexical items such as "strolled", "chat", "cozy" and "friends". In Text (5) the pleasant young man of (4) has changed into a juvenile delinquent. The only differences between (3)-(5) lies in the exact choice between valenced synonyms or near synonyms selected to describe the protagonist and his environs. These are summarized in Table 2.

TABLE 2

Valence of Synonyms

| TEXT (3): NEUTRAL VALENCE | TEXT (4): POSITIVE VALENCE | TEXT (5): NEGATIVE VALENCE |
|---|---|---|
| Eighteen year old | Young man | Teenaged male |
| walked | Strolled | strutted |
| part of town | Neighborhood | turf |
| stopped | Lingered | loitered |
| Talk | Chat | shoot the bull |
| Store | Shop | dive |
| Food | Groceries | grub |
| Small | Cozy | cramped |
| apartment | Place | hole in the wall |
| Lived | Shared | crashed |
| people | Friends | cronies |

The actual valence of a lexical item is not necessarily identical with the base valence of the lexical item in a lexicon. To take a simple example, the sentence "John is not brilliant." The lexical item "brilliant" has a positive base valence, but the sentence does not express a positive evaluation of John's mental prowess. On the contrary, the negative term "not" when applied to "brilliant" effectively counteracts or shifts the valence of "brilliant" from positive to negative. Therefore, the base valence can change to reflect the context in which the lexical item occurs. Words and phrases that affect the valence of lexical items are referred to as contextual valence shifters (CVS's). A CVS can affect the base valence of lexical items in its scope. For example, the CVS "not" in "John is not brilliant" has lexical item scope—it only modifies the lexical item that follows it.

In one embodiment, a negator is a CVS that can invert the base valence of a lexical item. By way of a non-limiting example, negators can belong to various word classes (e.g., never, none, nobody, nowhere, nothing, neither, etc.). The combination of a positively valenced lexical item with a negator turns the evaluation as a whole into a negative one; inversely the combination of a negator with a negatively valenced lexical item turns the whole into a positive evaluation.

TABLE 3

Negator and Intensifier Examples

| | SPEECH | ATTITUDE |
|---|---|---|
| (6) | John is clever$^{+1}$. | $S \xrightarrow{\pm1}$ John |
| (7) | John is not clever$^{+1}$. | $S \xrightarrow{-1}$ John |
| (8) | Each of them is successful$^{+1}$. | $S \xrightarrow{\pm1}$ Them |
| (9) | None of them is successful$^{+1}$. | $S \xrightarrow{-1}$ Them |
| (10) | John seldom is successful$^{+1}$ at tennis. | $S \xrightarrow{0}$ John + Tennis |
| (11) | John is always successful$^{+1}$ at tennis | $S \xrightarrow{+2}$ John + Tennis |
| (12) | John is less successful$^{+1}$ at tennis. | $S \xrightarrow{+0.5}$ John + Tennis |

By way of a non-limiting illustration, Table 3 depicts spoken language in the "SPEECH" column and corresponding attitude expressions in the "ATTITUDE" column. The base valence of lexical items in the SPEECH column is indicated with a superscript. For example, in speech (6) the lexical item "clever" has a positive valence (+1). The corresponding attitude column contains an expression which relates a speaker (e.g., S), an attitude $\xrightarrow{}$, and an entity (e.g., John). The attitude symbol $\xrightarrow{}$ expresses the speaker's attitude towards an entity as a positive or negative number n above the arrow. In one embodiment, n can be determined by summing the valence values of lexical items (referring to a particular entity/event) after they have been adjusted to reflect the influence of the contexts in which they occur. In another embodiment, n can be determined by a weighted average of lexical items (referring to a particular entity/event).

Referring to Table 3, speech (6) has lexical item "clever" (in italic typeface for readability). In one embodiment, the base valence of "clever" can be +1, which is indicated by a superscript. The corresponding attitude expression reflects this as a positive attitude towards entity "John" (+1). Speech (7) includes a negator "not" (in bold typeface for readability) indicating that it acts to negate the valence of lexical items in its scope. In this case, "not" negates the positive valence of "clever" resulting in a negative attitude expressed towards John (−1). Similar examples are provided in speeches (8) and (9).

In one embodiment, CVS's can serve to attenuate or strengthen valence rather than negate it (e.g., "less" in "less efficient" or "deeply" in "deeply suspicious"). This type of CVS is referred to as an intensifier. Referring again to Table 3, speeches (10)-(12) illustrate intensifiers. In one embodiment, intensifiers can reduce or increase the valence of lexical items in their scope. For example, in speech (10) the lexical item "successful" which has a base valence of +1 has been neutralized by the intensifier "seldom". In speech (11), the intensifier "always" has the effect of strengthening the positive value of "successful" (+2). In speech 12, "less" weakens the valence of the "successful" (+0.5).

TABLE 4

Presupposition Examples

| | SPEECH | ATTITUDE |
|---|---|---|
| (13) | It is sufficient$^{+1}$. | $S \xrightarrow{\pm1}$ It |
| (14) | It is barely sufficient$^{+1}$. | $S \xrightarrow{0}$ It |
| (15) | He barely$^{-1}$ got into Foothill College. | $S \xrightarrow{-1}$ He |
| (16) | He even$^{+1}$ got into Harvard. | $S \xrightarrow{\pm1}$ He |
| (17) | He failed to tell me she had been in jail$^{-1}$. | $S \xrightarrow{-1}$ She $S \xrightarrow{-1}$ He |
| (18) | The brilliant$^{+1}$ organizer failed to solve the problem$^{+1}$. | $S \xrightarrow{\pm1}$ Organizer |

In one embodiment, a presupposition can alter the valency of lexical items in its scope. Expectations that are not borne-out can have positive and negative consequences in terms of the valence of a lexical item under consideration. A presupposition not only conveys information that something has (or has not) happened but also that the speaker was expecting otherwise. Referring to Table 4, speech (13) illustrates lexical item "sufficient" in one embodiment has a base valence of +1. The presupposition introduced by the CVS "barely" in (14) modifies "sufficient" to suggest that the speaker believed that "it" should have been sufficient, but hardly was. Therefore, the valence ascribed to "sufficient" is neutralized, reflecting the speaker's negative attitude towards the entity/event represented by "it".

In one embodiment, CVS's that would introduce presuppositions can have a negative or a positive connotation even when there are no lexical items in their scope. Referring again to Table 4, the term "barely" in speech (15) leads to the conclusion that it should have been much easier for the entity referred to by "he" to get into Foothill College. Since this was not the case, the speech reflects the speaker's negative assessment of the entity as delineated in the corresponding attitude expression. Likewise, speech (16) illustrates that the speaker did not expect the entity referred to by "he" to get into Harvard, but he nonetheless did. The result is reflected as a positive attitude towards the entity (+1).

Speech (17) in Table 4 illustrates an attitude expression involving more than one entity. One entity is referred to by "he" and the other by "she". The speaker expresses a negative attitude towards the entity referred to by "she" through the use of the lexical item "jail" which has a base valence of −1. Indirectly, the speaker is also expressing a negative assessment of the entity referred to by "he" through the use of a presupposition introduced by the term "failed" since the speaker expected that "he" should have shared this information with the speaker but did not. Use of a term that carries a presupposition can also lead to irony, as is the case in speech (18). Here, the lexical item "solve the problem" has a positive base valence (+1) as does "brilliant" (+1). However, the presence of the term "failed" serves to neutralize the valence of "solve the problem". But there is also an indirect negative evaluation of the person to whom the failure is attributed. By ironically referring to the ineffective "organizer" as "brilliant", the speaker is also expressing a negative attitude towards the "organizer". Thus, the adjusted attitude is calculated by adding brilliant (−1)+solve the problem (0)=−1.

TABLE 5

Connector Examples

| SPEECH | ATTITUDE |
| --- | --- |
| (19) Although Boris is brilliant$^{+1}$ at math, he is a horrible$^{-1}$ teacher. | S$\xrightarrow{-1}$Boris |
| (20) Experts believe that at least half of all Americans will have the freedom$^{+1}$ to chose$^{+1}$ their electricity supplier within the next five years. Yet many Americans remain deeply suspicious$^{-1}$. | S$\xrightarrow{-1}$View of Deregulation |

In one embodiment, connectors such as "although", "however", "but", "on the contrary", "notwithstanding", etc. not only introduce information, they specifically act on information elsewhere in the text to mitigate the force of that information and thus serve as CVS's. For example, in speech (19) (Table 5) while the statement "Boris is brilliant at math" positively assesses Boris' math skills, the force of "although" combined with the negative assessment in the sentence's main clause "he is a horrible teacher" effectively neutralizes the positive force of the evaluation as applied to Boris. In computing the speaker's attitude towards Boris, therefore, the effect of the connector "although" is to neutralize the effect of the positive assessment, resulting in a negative assessment score for the sentence.

In one embodiment, connectors that function within sentences (e.g., "however") can also function across sentences. By way of a non-limiting example, consider the first sentence in speech (20) (Table 5). The valence of all attitude expressing terms in the first sentence is positive: freedom (+1), to choose (+1). The initial valence computation is +2. The second sentence begins with the connector "yet" which, unlike "although", applies to mitigate the force of information which precedes it. In this example, "yet" followed by negative valenced terms acts to neutralize the force of the positive terms in the preceding paragraph. Thus, in computing the attitude of the speaker towards American views of deregulation, the initial valence computation of the first sentence is recomputed to 0 and the sum score for both sentences is −1.

TABLE 6

Modal Examples

| SPEECH | ATTITUDE |
| --- | --- |
| (21) Mary is a terrible$^{-1}$ person. She is mean$^{-1}$ to her dogs. | S$\xrightarrow{-2}$Mary |
| (22) If Mary were a terrible$^{-1}$ person, she would be mean$^{-1}$ to her dogs. | S$\xrightarrow{0}$Mary |

Natural language makes a distinction between events or situations which are asserted to have happened, are happening or will happen (realis events) and those which might, could, should, ought to, or possibly occurred or will occur (irrealis events). For example, "if" is a term which creates an irrealis context. The CVS's which set up a context of possibility or necessity are called modal operators. Model operators can initiate a context in which lexical items express an attitude towards entities which does not necessarily reflect the speaker's attitude towards those entities in an actual situation under discussion. While, as is the case with individual connectives discussed above, precisely how each modal operator functions to modify base valence may differ, in one embodiment each operator will function to shift the valence in some manner and to some degree.

Referring to Table 6 and speech (21), the lexical items "terrible" and "mean" are negatively valenced. The combined score for score for the sentences is −2. However, the sentence in speech (22) does not assert either that Mary is a terrible person or that she is mean to her dogs. On the contrary, the force of "were" suggests that she is not mean to her dogs while the "if" sets up a context in which Mary is not necessarily a terrible person. Therefore, the modal operators neutralize the base valence of "terrible" and "mean", resulting in a neutral attitude expression. Similarly to some connectives (e.g., "however") modal context initiators may set up irrealis contexts that span more than one sentence. In such so-called modal subordination cases, all of the valence terms within the scope of the irrealis term are modified even though they may occur in different sentences.

In one embodiment, there are three CVS's which operate at the linguistic level of a discourse and modify the base valence of terms within their scope: Reported Speech and Thought, Elaboration, and Genre.

TABLE 7

Reported Speech and Thought Examples

| SPEECH | ATTITUDE |
| --- | --- |
| (23) Mary was a slob$^{-1}$. | S$\xrightarrow{-1}$Mary |
| (24) John said that Mary was a slob$^{-1}$. | John$\xrightarrow{-1}$Mary<br>S$\xrightarrow{0}$Mary |
| (25) John said that Mary was a slob$^{-1}$ and he is right$^{+1}$. | John$\xrightarrow{-1}$Mary<br>S$\xrightarrow{-1}$Mary<br>S$\xrightarrow{+1}$John |
| (26) The utilities argue that they performed glowingly$^{+1}$. But the public remembers those gloomy$^{-1}$, rotten$^{-1}$ nights. | S$\xrightarrow{-2}$Utilities |

Table 7 contains examples illustrating Reported Speech and Thought CVS operators. In speech (23), the attitude expression is −1 since "slob" has a base valence of −1. Speech (24) introduces the reported speech operator "said". What is being asserted by the speaker in speech (24) is that John "said" something unflattering about Mary, not that the speaker accepts John's assessment of her. Since it would not be contradictory for a text to read: "John said that Mary was a slob but she is not," items within the scope of a Reported Speech or Thought operator in one embodiment are not initially be computed into the score evaluating a speaker's belief. Therefore, while John expresses a negative attitude towards Mary, this does not figure into the attitude of the speaker (which in this case remains neutral or zero). However, it is possible that information later in the speech could force its inclusion. This is the case in speech (25) wherein the speaker is asserting that John said something unflattering about Mary and that the speaker agrees with John's assessment. Therefore, the negative valence attached to "slob" will be counted along with the positive valence of "right".

In speech (26), both "argue" and "remembers" are examples of Reported Speech and Thought operators. Therefore, the valence of the reported material is initially not ascribed to the speaker. However, the "but" which sets up the contrast between what was argued and what was remembered has been chosen by the speaker to contrast mere arguing with remembering which, while expressing a mental state, is also assumed to pertain to events that did happen. The net result is that the utilities argument is ignored while the public's memory is included. In one embodiment, Reported Speech and Thought contexts can be detected using standard natural language processing techniques.

TABLE 8

Elaboration Examples

| | SPEECH | ATTITUDE |
|---|---|---|
| (27) | John walks a lot.<br>Last month he walked 25 miles on Tuesdays.<br>Wednesdays he walked another 25 miles.<br>Every weekend he hikes at least 50 miles each day. | $S \xrightarrow{0} John$ |
| (28) | John is a terrific$^{+1}$ athlete.<br>Last week he walked 25 miles on Tuesdays.<br>Wednesdays he walked another 25 miles.<br>Every weekend he hikes at least 50 miles a day. | $S \xrightarrow{+4} John$ |
| (29) | Through this year's sweltering$^{-1}$ summer, many homes from New York to New Orleans lost power (and with it, their air conditioning$^{+1}$).<br>Downtown Chicago was plunged$^{-1}$ into darkness$^{-1}$ and the businesses were silenced$^{-1}$.<br>A major university laboratory even$^{-1}$ lost decades of frozen samples. | $S \xrightarrow{-5} Utilities$ |
| (30) | John is a terrific$^{+1}$ athlete.<br>Last week he slept 5 hours on Tuesday during the day.<br>Wednesdays he napped for another 5 hours.<br>Every weekend he spends at least 15 hours a day resting up in his hammock. | $S \xrightarrow{-4} John$ |

The second discourse CVS is Elaboration. Elaboration concerns the discourse structure itself and how it affects the base valence of lexical items. In one embodiment, a discourse structure be represented by a structural analysis of a speech which represents language encoded in by speech in terms of semantic relationships between units of the text. This can be accomplished by segmenting the source text into discourse units (DU's). DU's are portions of text small enough for the particular structural analysis technique employed to extract semantic meaning from and thereby build a semantically correct structural representation of the source text. Automatic segmentation of the source text can be accomplished by statistical methods or by shallow or deep parsing techniques. Statistical methods of segmentation use machine learning techniques to tag words and then aggregate strings of tagged words into structures that learning algorithms expect to correspond to DU's. Shallow parsing methods use tagged words and knowledge of some simple linguistic structures to break sentences into clauses and phrases. Deep parsing methods use word tagging and extensive rules to produced detailed analysis of the relations obtaining among the words making up a sentence.

Once a source text is segmented, a structural representation (e.g., a discourse tree) can be created based on semantic relationships among DU's. In one embodiment of the invention, two such relations are lists and elaborations. A list relationship involves associating DU's that express a similar relationship to some more general concept. An elaboration relation involves DU's that give more detailed information of some sort about other DU's preceding them in the linear organization of the text. These earlier DU's structurally dominate the elaborating DU's. Both symbolic and statistical natural language processing methods can be applied to determining discourse structure.

Table 8 illustrates speeches in which elaboration operates through the structure of discourse to modify the base valence of lexical items. Speech (27) is an example of an elaboration in which lexical valence does not play a role. For purposes of non-limiting illustration, each sentence in speeches (27)-(30) corresponds to a DU and elaborating DU's are indented. The first sentence is considered the dominating DU. The last three sentences of speech (27) each give more detail about John's walking a lot: last month he walked 5 miles on Tuesdays; Wednesdays he walked another 25 miles; and every weekend he hikes at least 50 miles each day. These sentences illustrate the concept in the dominating DU. In speech (28), lexical valence information is introduced in "terrific" in the dominating DU. Since each of the dominated DU's is an example of athleticism, the positive valence of terrific is inherited by each DU. This can be paraphrased by saying, John's terrific athleticism is attested to by the fact that: 1) last week he walked 5 miles on Tuesdays; 2) Wednesdays he walked another 5 miles; and 3) every weekend he hikes at least 15 miles a day. Effectively, the score for this one instance of the positively valenced term "terrific" as applied to the entity John is multiplied by four.

In speech (29), the elaborating DU's contain at least one negatively valenced lexical item that illustrate losing power during a sweltering summer. The negative valence of the elaborating items is −4. This can then be combined with the dominating DU's valence of −1, yielding an attitude expression of −5. This might be offset by "air conditioning", a positively valenced term. However, the positive air conditioning was lost, which neutralizes the positive force of air conditioning.

A related process can be used to determine in some cases if a valenced lexical item is being used ironically. Consider speech (30). In contrast to the previous example of John's athletic ability, the elaborating information contradicts the positively valenced assertion in the dominating sentence, thereby effectively negating it. However, the effect of such an ironic use of language is stronger than merely neutralizing a positive or negative statement, rather the force of the rhetorical figure of irony can be computed as follows:

John is NOT a terrific athlete. Evidence for NOT:
Last week he slept 5 hours on Tuesday during the day.
Wednesdays he napped for another 5 hours Every weekend he spends at least 15 hours a day resting up in his hammock.

Adjusted valence is −4.

TABLE 9

Genre Example

| | SPEECH | ATTITUDE |
|---|---|---|
| (31) | This film should be brilliant[+1].<br>The characters are appealing[+1].<br>Stallone plays a happy[+1], wonderful[+1] man.<br>His sweet[+1] wife is beautiful and adores him.<br>He has a fascinating[+1] gift[+1] for living life to the fullest.<br>It sounds like a great[+1] story, however it can't hold up[−1]. | S−2→John |

Speech can also be created in conformity with genre constraints. For example, an obituary in a newspaper reflects a set of organizing principles that dictate the order of information, the type of language used and the types of information considered appropriate. Similarly, an instructive manual, a product review, a persuasive article or a review of a movie will each display the form and stylistic conventions of the document genre to which it belongs. These document level genre constraints can be exploited in determining the attitude of speakers towards the entities in their speech.

Table 9 contains an example of a movie review. A movie review can contain two types of information: information about the events and situations in the story and information about the film which has been created to tell the story. Information about the story can involve recounting the events in the story and talking about the characters played by the actors; information about the film can include descriptions and explicit evaluations of the acting, the directing, the script and other aspects of the production. In one embodiment, it is necessary to separate the description of the entities pertaining to the story from the description of the entities pertaining to the production. Only the valence scores of the entities pertaining to the production should be considered in ascertaining if the review is positive or negative.

Speech (31) in Table 9 illustrates a common rhetorical strategy in reviews which is to present thwarted expectations: where the speaker sets up a deliberate contrast to an expected position. In the first sentence, "brilliant" is within the scope of presupposition "should" and is neutralized. In the second sentence, "appealing" is an elaboration under "should"—its effect is also neutralized. "Happy", "wonderful", "sweet", etc. all refer to story world entities and thus do not count. In the last sentence, the valence of "great" is reversed by the connector "however". Thus, the adjusted score for the speech is −2.

Besides conveying lexical items, a speech signal carries prosodic cues (e.g., phrasing, pitch accent placement, amplitude, pitch range, etc.) that a speaker can use to encode a specific relationship between the propositional content realized in the speech, the speaker's beliefs about how the proposition will (or should) be interpreted, and the mutual beliefs of the discourse participants. This theory was proposed by Janet Pierrehumbert and Julia Hirschberg in *The Meaning of Intonation Contours in the Interpretation of Discourse*, in INTENTIONS IN COMMUNICATION 271-311 (Philip R. Cohen, et al., eds., 1990), which is hereby incorporated by reference in its entirety.

In one embodiment, an utterance has a particular prosodic pattern that demarks the relative prominence of syllables. Relative salience can be manifested in the tonal characteristics of the speech signal (e.g., amplitude, duration, etc.) and can result in prominent words being characterized as more perceptually salient than other words. By way of a non-limiting illustration, speech (32) indicates that prominence (i.e. pitch accent) is on the underlined word "always":

(32) John is always late.

Prominence is associated with the lexically stressed syllable of a word, rather than the word as a whole. In speech (33), the lexical stress falls on the syllable "al", thus the pitch accent is associated with the lexically stressed syllable:

(33) John is always late.

One component of the speech signal is the fundamental frequency ($F_0$), which can be characterized by a sequence of high (H) tones and low (L) tones. An L tone indicates a local $F_0$ minimum whereas an H tone indicates a local $F_0$ maximum, each of which is determined within the context of a speaker's normal pitch range. H and L tones in various combinations form pitch accents, phrase accents, and boundary tones.

Pitch accents mark as prominent the lexical items with which they are associated. A pitch accent is comprised of a single H or L tone, or a combination of two tones. The pitch accent is aligned with the primary stressed syllable of the word, and is marked with an asterisk (e.g., H* and L*). A plus sign ("+") is used to indicate a bitonal pitch accent event, which is a combination of two tones. In the case of the bitonal accents, the asterisk always follows the tone which represents the phonological category of the pitch accent. For example, L*+H indicates that the lexically stressed syllable is associated with a low tone, and is followed by a trailing high tone. In one embodiment, there are six possible pitch accents: H*, L*, L*+H, L+H*, H*+L, and H+L*. This can be expressed in the following notation, whereby a vertical bar ("|") represents a logical OR:

Pitch accent={H*|L*|L*+H|L+H*|H*+L|H+L*}

A phrase accent is a freestanding H or L tone (marked H− or L−) which marks the end of an intermediate phrase. An intermediate phrase consists of at least one pitch accent and a phrase accent. This relationship can be expressed in the same notation used for the pitch accent:

Phrase accent={H-|L|}

Intonational phrases contain at least one intermediate phrase. The end of each intonational phrase consists of a phrase accent and an additional high or low boundary tone, which is indicated with the "%" diacritic (marked H% or L%). In one embodiment, a tune is a sequence of one or more pitch accents, one or more phrase accents and a closing boundary tone. These can be summarized follows:

Boundary tone={H|H%|H-L%|L-H%|L-L%}

Intonational phrase=(<pitch accent>*<phrase accent>)*<boundary tone>

Tune=<intonational phrase>*

A particular tune may be utilized by a speaker to indicate a specific relationship between the propositional content realized in the intonational phrase and the mutual beliefs of the discourse participants. Each component of a tune can serve a certain function: a pitch accent can render a lexical item salient (or focused); a phrase accent can convey a degree of relatedness between intermediate phrases; and a boundary tone can segment the speech stream into intonational phrases. The phonological category to which each tonal component belongs is a major indicator of the semantic/pragmatic role that a tune will assume. By way of a non-limiting example, phonologically low accents (e.g., L*, H+L*, and L*+H) mark information that is not intended to be predicated in a mutual belief space between hearer and speaker, whereas phonologically high accents (e.g., H*, H*+L, and L+H*) convey that the information is to be predicated.

In one embodiment, a mutual belief space can be established with open expressions having variables instantiated based on pitch-accented words. For example, in (34) the words "John" and "naive" have H* accents aligned with the lexically stressed syllable:

(34) John is naive.
         H*      H*

The accented words can be instantiated in an open expression (35):
(35) x is y
  x (H*)
  y (H*)
  x=John
  y=naive In one embodiment, when an instantiated word in an open expression corresponds to at least part of a lexical item, the attitude encoded by the lexical item is manifested in the belief space. For example, in (34) the accented lexical item "naive" establishes the speaker's negative assessment of John in the mutual belief space.

In one embodiment, a speaker/speaker utilizes H* accents on lexical items that the speaker wishes to convey as salient and/or that represent attitudes to be added to the mutual belief space between the speaker and a hearer. Some possible tunes in this regard are: H*L-L%, H*H-L% and H*H-H%. In one embodiment, use of such a tune can have the effect of scaling the valence of accented lexical items to establish their relative prominence from the speaker's standpoint. By way of a non-limiting example, if a lexical item had a valence of −1 or 1, scaling the valence by a factor of 1.5 would result in valences of −1.5 and 1.5, respectively.

In one embodiment, a speaker can use the L* accent to express incredulity and/or that a lexical item is not to be instantiated in the mutual belief space between the speaker and a hearer. The L*H-H% tune can indicate incredulity in regards to an accented lexical item. In this regard, the L*H-H% tune acts as a connector CVS by mitigating the force of information/attitudes in the mutual belief space. In example (36), "S1" indicates speech spoken by speaker one, and likewise "S2" labels speech spoken by speaker two. Both speakers can hear each other.
(36) S1: Everyone loves Mark's economics class.
  S2: Mark is a good teacher
       L*L*H-H%

In speech (36), S1 is implying through use of the L*H-H% tune that Mark is not a good teacher (i.e., S1 has a negative attitude of Mark), contrary to what S2 has implied.

In one embodiment, the L*L-H% tune can be used to (insultingly) imply that the accented lexical item should be in the mutual belief space, but for some reason a hearer was not aware of this. By implication the L*L-H% tune also establishes a contrast with what has come before in a dialog.

Thus, the L*L-H% tune can also act as a connector CVS. This is illustrated in speech (37):
(37) S1: I will get Mark and Susan some water.
  S2: I'm sure I would also like some water
       L*L-H%

The foregoing tunes are summarized in Table 10.

TABLE 10

Tune Examples

| TUNE TYPE | DESCRIPTION |
|---|---|
| H* L-L % | Speaker associates H* accents with lexical items that speaker |
| H* H-L % | wishes to convey as salient and/or added to the mutual |
| H* H-H % | belief space between the speaker and a hearer. |
| L* H-H % | Speaker uses to convey incredulity. |
| L* L-H % | Speaker uses to convey that accented lexical item should be in the mutual belief space between the speaker and a hearer, and simultaneously contrast with what came before. |

Phonological categorization also provides a means by which boundary tones may be differentiated on a more semantic or pragmatic basis. Typically, a phonologically low boundary tone (e.g., L-L% or H-L%) conveys some notion of finality, while a phonologically high boundary tone (e.g., H-H% or L-H%) tends to be utilized in order to specify that an utterance should be further discussed between discourse participants, or that a subsequent intonational phrase will be an expansion of the current intonational phrase. In one embodiment, low boundary tones can be used to demark the terminus of an elaboration.

Figure 1:
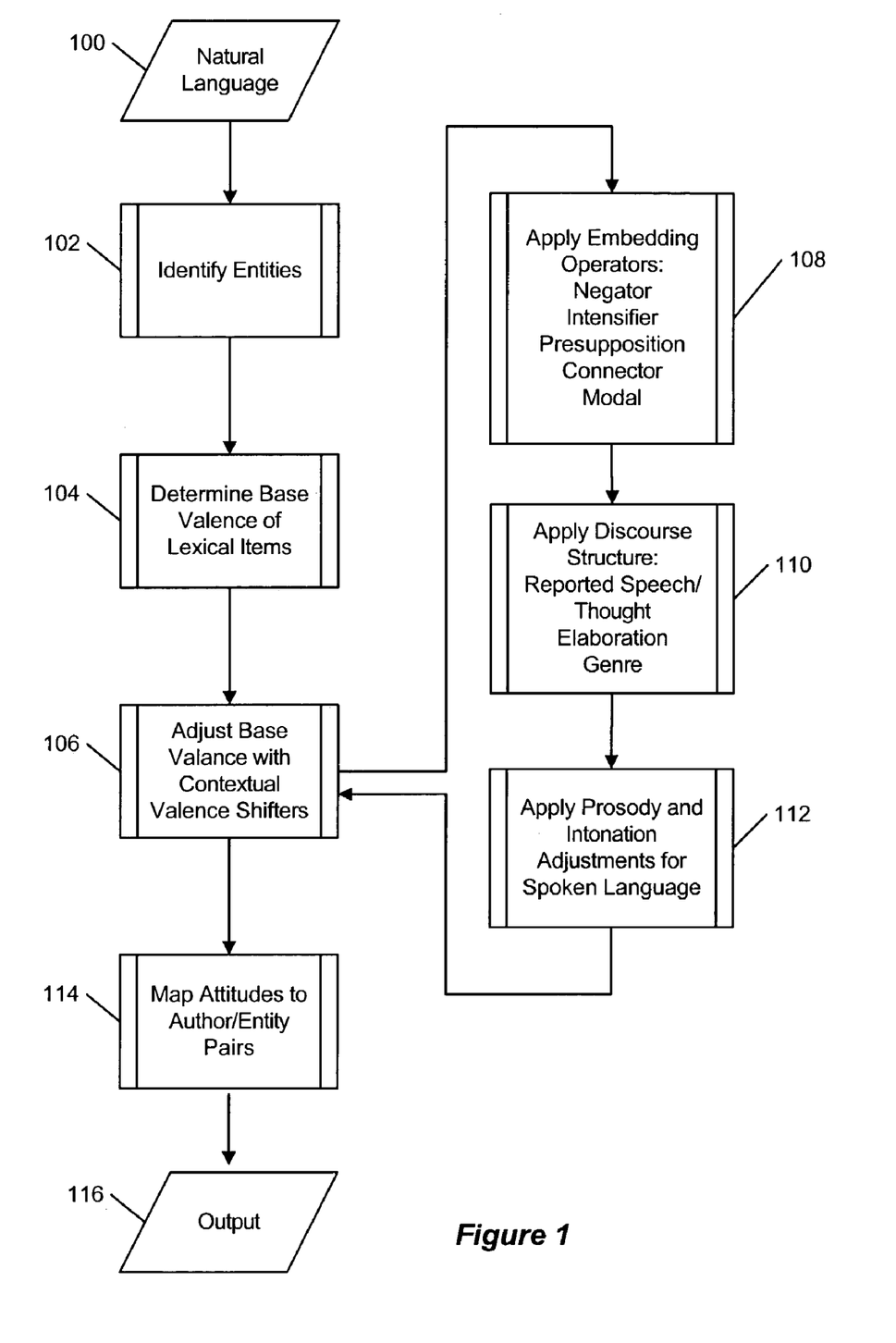
FIG. 1 is a flow chart illustrating one embodiment of the invention.

FIG. 1 is a flow chart illustrating one embodiment of the invention. FIG. 1 depicts general method steps for illustrative purposes and in no way should be interpreted as limiting any embodiment to particular steps or a particular arrangement of steps. In addition, not all steps need be applied. Natural language speech 100 is provided to step 102. Step 102 identifies entities/events in the speech using any information extraction techniques currently in use or to be developed in the future. Depending on the granularity of the information extraction, fewer or greater numbers of entities will be identified. In one embodiment, step 102 maintains associations betweens identified entities and the lexical items that refer to them for use in step 114. Next, step 104 determines the base valence of lexical items in the speech. In one embodiment, step 104 utilizes a lexical resource. In another embodiment, domain information is derived from the speech to aid in determining the appropriate base valence. In yet another embodiment, step 104 can associate speakers with lexical items as it determines base valence. Step 106 adjusts the base valence of the lexical items by taking into account the affect of CVS's in steps 108-112.

In Step 108, the affect of negators, intensifiers, presuppositions, connectors and modals can be determined. Negators can negate valence. Intensifiers can strengthen or weaken valence. Presuppositions can have a negative impact on valence if the consequences of a not born-out expectation are negative and can have a positive impact if the consequences are positive. Connectors indicate a different point of view and can neutralize or negate valence. Modals establish a condition wherein the condition can neutralize or negate the valence. In step 110, the affect of reported speech/thought, elaboration and genre constraints can be computed. Reported speech/thought describes a context in which attitude is ascribed to a speech entity rather than a speaker and can neutralize valence. Elaborations adjusts valence to reflect the valence of at least one elaborating lexical item that elaborates on a lexical item under consideration. Genre adjusts valence using knowledge of expected genre content (e.g., a movie review). Adjustments to the base valence based on prosody and intonation can be determined in step 112.

Finally, step 114 associates attitudes expressed by the adjusted valences determined in step 106 with their speakers and target entities/events. In one embodiment, a speaker's attitude towards an entity/event can be expressed as the summation of all adjusted valences of lexical items attributable to the speaker that refer to the entity/event. This can be provided to output 116 as a set associations wherein each association comprises a speaker, an attitude and an entity/event.

Figure 2:
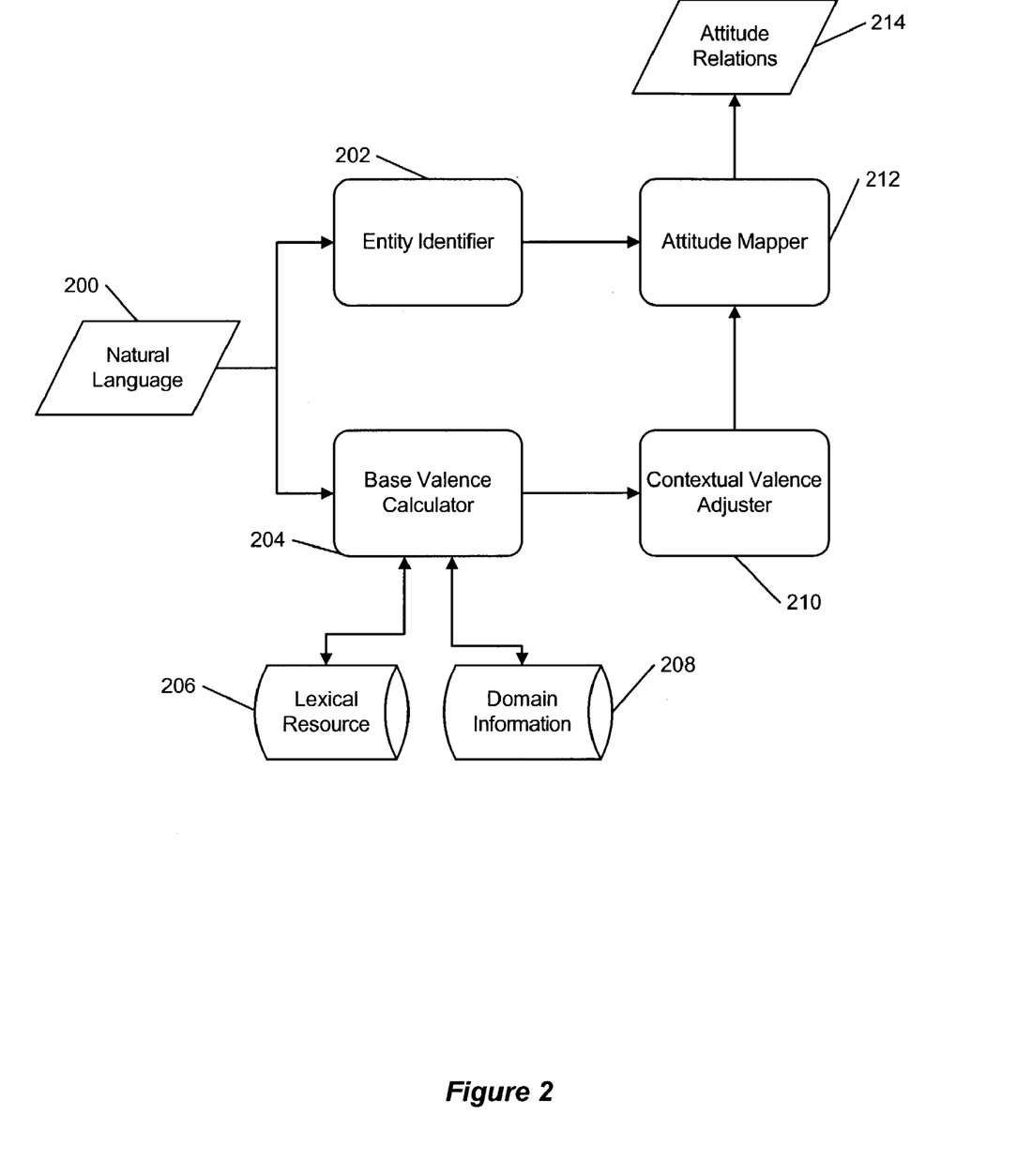
FIG. 2 is diagram of a system in accordance to one embodiment of the invention.

FIG. 2 is diagram of a system in accordance to one embodiment of the invention. Although this diagram depicts objects as functionally separate, such depiction is merely for illustrative purposes. It will be apparent to those skilled in the art that the objects portrayed in FIG. 2 can be arbitrarily combined or divided into separate software, firmware or hardware components. Furthermore, it will also be apparent to those skilled in the art that such objects, regardless of how they are combined or divided, can execute on the same computing device or can be arbitrarily distributed among different computing devices connected by a network.

Natural language speech 200 is provided to entity identification module 202 and base valence calculator 204. Base valence calculator 204 determines the base valence for each lexical item in speech 200. In one embodiment, base valence calculator 204 utilizes a lexical resource and domain information to determine the base valence of a lexical item. Contextual valence adjuster 210 is coupled to base valence calculator 204 and adjusts the base valence of lexical items based one or more CVS's. In one embodiment, module 210 associates attitudes expressed by the adjusted valences determined in step 106 with their speakers and provides this information to attitude mapper 212. Entity identifier 202 identifies entities in speech 200 and provides this information to attitude mapper 212. Attitude mapper 212 associates the entities provided by module 202 with the speaker/attitude pairs provided by module 210 to generate a set of attitude relations 214 that comprise an association between a speaker, an attitude and an entity/event.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A method for analyzing speech containing at least one lexical item, said analysis to determine an attitude of a speaker towards an entity, comprising:
   determining at least one actual valence for the at least one lexical item by analyzing the at least one lexical item in context of said speech;
   determining said attitude based on the at least one actual valence;
   associating said speaker, said entity and said attitude;
   wherein the at least one lexical item encodes attitude information about said entity;
   determining at least one base valence for the at least one lexical item; and
   wherein analyzing the at least one lexical item in context includes adjusting the at least one base valence based on a contextual valence shifter (CVS) selected from the group consisting of a presupposition CVS, a genre CVS and a tune.

2. The method of claim 1, wherein: the at least one CVS is a presupposition CVS.

3. The method of claim 1, further comprising:
   determining at least one additional CVS, where the additional CVS is one of: a negator, an intensifier, a presupposition, a connector, a modal, reported speech/thought, an elaboration, a genre and a tune.

4. The method of claim 1, wherein:
   the at least one CVS is a tune.

5. The method of claim 4 wherein:
   the tune can scale the at least one base valence.

6. The method of claim 4 wherein:
   the tune can indicate a different point of view and can neutralize or negate the at least one base valence.

7. The method of claim 3, wherein:
   the negator CVS is a word or phrase that can negate the at least one base valence.

8. The method of claim 3, wherein:
   the intensifier CVS is a word or phrase used for emphasis or de-emphasis that can strengthen or weaken the at least one base valence, respectively.

9. The method of claim 1, wherein:
   the presupposition CVS can have a negative impact on the at least one base valence if the consequences of a not born-out expectation are negative and can have a positive impact on the at least one base valence if the consequences of the not born-out expectation are positive.

10. The method of claim 3, wherein:
the connector CVS is a word or phrase that indicates a different point of view and can neutralize or negate the at least one base valence.

11. The method of claim 3, wherein:
the modal CVS is a word or phrase that establishes a condition wherein the condition can neutralize or negate the at least one base valence.

12. The method of claim 3, wherein:
the reported speech/thought or other linguistic device CVS describes a context in which attitude is ascribed to a second entity rather than the speaker and can neutralize the at least one base valence with respect to the speaker.

13. The method of claim 12 wherein:
the reported speech/thought CVS does not neutralize the at least one base valence if the speaker adopts the attitude ascribed to the entity.

14. The method of claim 1, wherein:
the at least one CVS is a genre CVS.

15. The method of claim 4, wherein the tune includes a pitch accent, a phrase accent and a boundary tone.

16. The method of claim 14, wherein:
the genre CVS can adjust the base valence using knowledge of expected genre content.

17. The method of claim 16 wherein:
the genre can be a movie review.

18. The method of claim 1, wherein:
the at least one base valence represents positive or negative attitudinal information encoded in the lexical item.

19. The method of claim 1, wherein:
determining the at least one base valence is based on taking into account the domain in which the at least one lexical item occurs.

20. A method for analyzing speech containing at least one lexical item, said analysis to determine an attitude of a speaker towards an entity, comprising:
determining at least one base valence for said at least one lexical item;
determining at least one actual valence for the at least one lexical item by adjusting the at least one base valence based on at least one contextual valence shifter (CVS) selected from the group consisting of a presupposition CVS, a genre CVS and a tune;
determining said attitude based on the at least one actual valence;
associating said speaker, said entity and said attitude; and
wherein said at least one lexical item encodes attitude information about said entity.

21. The method of claim 20 further comprising determining at least one additional CVS, where the additional CVS is one of: a negator, an intensifier, a presupposition, a connector, a modal, reported speech/thought, an elaboration, a genre, and a tune.

22. The method of claim 20, wherein:
the tune can scale the at least one base valence.

23. The method of claim 20, wherein:
the tune can indicate a different point of view and can neutralize or negate the at least one base valence.

24. The method of claim 21 wherein:
the negator CVS is a word or phrase that can negate the at least one base valence.

25. The method of claim 21 wherein:
the intensifier CVS is a word or phrase used for emphasis or de-emphasis that can strengthen or weaken the at least one base valence, respectively.

26. The method of claim 20, wherein:
the presupposition CVS can have a negative impact on the at least one base valence if the consequences of a not born-out expectation are negative and can have a positive impact on the at least one base valence if the consequences of the not born-out expectation are positive.

27. The method of claim 21 wherein:
the connector CVS is a word or phrase that indicates a different point of view and can neutralize or negate the at least one base valence.

28. The method of claim 21 wherein:
the modal CVS is a word or phrase that establishes a condition wherein the condition can neutralize or negate the at least one base valence.

29. The method of claim 21 wherein:
the reported speech/thought or other linguistic device CVS describes a context in which attitude is ascribed to a second entity rather than the speaker and can neutralize the at least one base valence with respect to the speaker.

30. The method of claim 29 wherein:
the reported speech/thought CVS does not neutralize the at least one base valence if the speaker adopts the attitude ascribed to the entity.

31. The method of claim 21 wherein:
the elaboration CVS adjusts the at least one base valence to reflect the valence of at least one elaborating lexical item that elaborates on the lexical item.

32. The method of claim 31 wherein:
a contradiction between the lexical item and the at least one elaborating lexical item can indicate irony.

33. The method of claim 20, wherein:
the genre CVS can adjust the base valence using knowledge of expected genre content.

34. The method of claim 33 wherein: the genre can be a movie review.

35. The method of claim 20 wherein: the at least one base valence represents positive or negative attitudinal information encoded in the lexical item.

36. The method of claim 20 wherein: determining the at least one base valence is based on taking into account the domain in which the lexical item occurs.

37. The method of claim 20 wherein: the at least one lexical item can be a contextual valence shifter.

38. The method of claim 20, wherein the tune includes a pitch accent, a phrase accent and a boundary tone.

39. A system for analyzing speech containing at least one lexical item, said analysis to determine an attitude of a speaker towards an entity, comprising:
a base valence calculator to determine at least one base valence of the at least one lexical item;
a contextual valence adjuster coupled to the base valence calculator, the contextual valence adjuster to adjust the at least one base valence based on at least one contextual valence shifter (CVS), selected from the group consisting of a presupposition CVS, a genre CVS and a tune;
an entity identifier to identity the entity; an attitude mapper coupled to the entity identifier and the contextual valence adjuster, the attitude mapper to determine the attitude based on the at least one adjusted valence and to associate the speaker, the entity, and an attitude.

40. The system of claim 39 wherein:
the base valence calculator utilizes a lexical resource; and wherein the lexical resource provides the at least one base valence of the at least one lexical item.

41. The system of claim 40 wherein:
the lexical resource uses domain information to determine the at least one base valence.

42. The system of claim 39 wherein:
the base valence calculator utilizes domain information to determine a domain for the at least one lexical item.

43. The system of claim 39 further comprising determining
at least one additional CVS, where the additional CVS is one of: a negator, an intensifier, a presupposition, a connector, a modal, reported speech/thought, an elaboration, a genre, and a tune.

44. The system of claim 39, wherein:
the tune can scale the at least one base valence.

45. The system of claim 39, wherein:
the tune can indicate a different point of view and can neutralize or negate the at least one base valence.

46. The system of claim 43 wherein:
the negator CVS is a word or phrase that can negate the at least one base valence.

47. The system of claim 43 wherein:
the intensifier CVS is a word or phrase used for emphasis or de-emphasis that can strengthen or weaken the at least one base valence, respectively.

48. The system of claim 39, wherein:
the presupposition CVS can have a negative impact on the at least one base valence if the consequences of a not born-out expectation are negative and can have a positive impact on the at least one base valence if the consequences of the not born-out expectation are positive.

49. The system of claim 43 wherein:
the connector CVS is a word or phrase that indicates a different point of view and can neutralize or negate the at least one base valence.

50. The system of claim 43 wherein:
the modal CVS is a word or phrase that establishes a condition wherein the condition can neutralize or negate the at least one base valence.

51. The system of claim 43 wherein:
the reported speech/thought or other linguistic device CVS describes a context in which attitude is ascribed to a second entity rather than the speaker and can neutralize the at least one base valence with respect to the speaker.

52. The system of claim 51 wherein:
the reported speech/thought CVS does not neutralize the at least one base valence if the speaker adopts the attitude ascribed to the entity.

53. The system of claim 43 wherein:
the elaboration CVS adjusts the at least one base valence to reflect the valence of at least one elaborating lexical item that elaborates on the lexical item.

54. The system of claim 53 wherein:
a contradiction between the lexical item and the at least one elaborating lexical item can indicate irony.

55. The system of claim 39, wherein:
the genre CVS can adjust the base valence using knowledge of expected genre content.

56. The system of claim 55 wherein:
the genre can be a movie review.

57. The system of claim 39 wherein:
the at least one base valence represents positive or negative attitudinal information encoded in the lexical item.

58. The system of claim 39 wherein: the at least one lexical item can be a contextual valence shifter.

59. The system of claim 39, wherein the tune includes a pitch accent, a phrase accent and a boundary tone.

60. A machine readable medium having instructions stored thereon that when executed by a processor cause a system to:
determine at least one actual valence for at least one lexical item by analyzing the at least one lexical item in context of a speech;
determine an attitude based on the at least one actual valence;
associate a speaker, an entity and the attitude;
wherein the at least one lexical item encodes attitude information about the entity;
determining at least one base valence for the at least one lexical item; and
wherein analyzing the at least one lexical item includes adjusting the at least one base valence based on a contextual valence shifter (CVS) selected from the group consisting of a presupposition CVS, a genre CVS and a tune.

61. The machine readable medium of claim 60, wherein the tune includes a pitch accent, a phrase accent and a boundary tone.

62. The machine readable medium of claim 60 further comprising determining:
at least one additional CVS, where the additional CVS is one of:
a negator, an intensifier, a presupposition, a connector, a modal, reported speech/thought, an elaboration, a genre, and a tune.

63. The machine readable medium of claim 60, wherein:
the tune can scale the at least one base valence.

64. The machine readable medium of claim 60, wherein:
the tune can indicate a different point of view and can neutralize or negate the at least one base valence.

65. The machine readable medium of claim 62 wherein:
the negator CVS is a word or phrase that can negate the at least one base valence.

66. The machine readable medium of claim 62 wherein:
the intensifier CVS is a word or phrase used for emphasis or de-emphasis that can strengthen or weaken the at least one base valence, respectively.

67. The machine readable medium of claim 60 wherein:
the presupposition CVS can have a negative impact on the at least one base valence if the consequences of a not born-out expectation are negative and can have a positive impact on the at least one base valence if the consequences of the not borne-out expectation are positive.

68. The machine readable medium of claim 62 wherein:
the connector CVS is a word or phrase that indicates a different point of view and can neutralize or negate the at least one base valence.

69. The machine readable medium of claim 62 wherein:
the modal CVS is a word or phrase that establishes a condition wherein the condition can neutralize or negate the at least one base valence.

70. The machine readable medium of claim 62 wherein:
the reported speech/thought or other linguistic device CVS describes a context in which attitude is ascribed to a second entity rather than the speaker and can neutralize the at least one base valence with respect to the speaker.

71. The machine readable medium of claim 70 wherein:
the reported speech/thought CVS does not neutralize the at least one base valence if the speaker adopts the attitude ascribed to the entity.

72. The machine readable medium of claim 62 wherein:
the elaboration CVS adjusts the at least one base valence to reflect the valence oft least one elaborating lexical item that elaborates on the lexical item.

73. The machine readable medium of claim 72 wherein:
a contradiction between the lexical item and the at least one elaborating lexical item can indicate irony.

74. The machine readable medium of claim 62 wherein:
the genre CVS can adjust the base valence using knowledge of expected genre content.

75. The machine readable medium of claim 74 wherein:
the genre can be a movie review.

76. The machine readable medium of claim 60 wherein:
the at least one base valence represents positive or negative attitudinal information encoded in the lexical item.

77. The machine readable medium of claim 60, wherein:
determining the at least one base valence is based on taking into account the domain in which the at least one lexical item occurs.

78. The machine readable medium of claim 60 wherein:
the at least one lexical item can be a contextual valence shifter.

* * * * *

UNITED STATES PATENT AND TRADEMARK OFFICE
CERTIFICATE OF CORRECTION

PATENT NO. : 7,260,519 B2  Page 1 of 1
APPLICATION NO. : 10/387719
DATED : August 21, 2007
INVENTOR(S) : Polanyi et al.

It is certified that error appears in the above-identified patent and that said Letters Patent is hereby corrected as shown below:

At Column 21, line 3, delete "oft" and replace with --of at--.

Signed and Sealed this

Twenty-seventh Day of November, 2007

JON W. DUDAS
*Director of the United States Patent and Trademark Office*